US009125201B2

(12) United States Patent
Kawasaki

(10) Patent No.: US 9,125,201 B2
(45) Date of Patent: Sep. 1, 2015

(54) RADIO COMMUNICATION SYSTEM, NETWORK DEVICE, RADIO TERMINAL, AND COMMUNICATION CONTROL METHOD

(75) Inventor: Akira Kawasaki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/110,110

(22) PCT Filed: Apr. 6, 2012

(86) PCT No.: PCT/JP2012/059536
§ 371 (c)(1),
(2), (4) Date: Oct. 4, 2013

(87) PCT Pub. No.: WO2012/137927
PCT Pub. Date: Oct. 11, 2012

(65) Prior Publication Data
US 2014/0024385 A1     Jan. 23, 2014

(30) Foreign Application Priority Data
Apr. 6, 2011   (JP) .................. 2011-084766

(51) Int. Cl.
*H04W 4/00*     (2009.01)
*H04W 72/04*     (2009.01)
*H04W 48/16*     (2009.01)
*H04M 1/00*     (2006.01)

(52) U.S. Cl.
CPC .......... *H04W 72/0446* (2013.01); *H04W 48/16* (2013.01)

(58) Field of Classification Search
CPC ..................................................... H04W 4/00
USPC ..................................................... 455/435.1
See application file for complete search history.

(56) References Cited

U.S. PATENT DOCUMENTS

| 2009/0005041 A1* | 1/2009 | Steinberg et al. .......... 455/435.2 |
| 2010/0022243 A1* | 1/2010 | Oommen et al. .......... 455/435.3 |
| 2010/0105381 A1 | 4/2010 | Takeda |

FOREIGN PATENT DOCUMENTS

| JP | 2007-124410 A | 5/2007 |
| JP | 2010-034640 A | 2/2010 |
| JP | 2010-074516 A | 4/2010 |
| JP | 2010-232919 A | 10/2010 |
| WO | 2008/108252 A1 | 9/2008 |

OTHER PUBLICATIONS

International Search Report; PCT/JP2012/059536; May 1, 2012.

* cited by examiner

*Primary Examiner* — Huy C Ho
(74) *Attorney, Agent, or Firm* — Studebaker & Brackett PC

(57) ABSTRACT

An HSS 140 calculates a ratio (cell search time-period distribution ratio) of a time period for searching a cell 11 configured by an LTE base station 10 to a time period for searching a cell 21 configured by a W-CDMA base station 20, and transmits a cell search time-period distribution ratio response including the cell search time-period distribution ratio, to a UE 200. When the UE 200 receives the cell search time-period distribution ratio response, the UE 200 searches the cell 11 and the cell 21 according to the cell search time-period distribution ratio included in the cell search time-period distribution ratio response.

9 Claims, 5 Drawing Sheets

RADIO COMMUNICATION SYSTEM, NETWORK DEVICE, RADIO TERMINAL, AND COMMUNICATION CONTROL METHOD

TECHNICAL FIELD

The present invention relates to a radio communication system including a network device and a radio terminal, where radio communication by a radio terminal is enabled by a plurality of communication schemes configuring different communication areas, a network device and a radio terminal in the radio communication system, and also relates to a communication control method in the radio communication system.

BACKGROUND ART

A radio terminal is provided with a function of searching a cell (communication area) by itself so as to continue communication during movement by sequentially connecting to a cell having a high reception sensibility. Further, a so-called dual terminal (for example, see PTL 1), that is, a radio terminal that supports a plurality of communication schemes such as W-CDMA (Wideband Code Division Multiple Access), GSM (Global System for Mobile Communications) (registered trademark), and LTE (Long Term Evolution) performs a cell search according to each communication scheme at a predetermined time period interval by effectively setting a cell search for the plurality of communication schemes.

CITATION LIST

Patent Literature

PTL 1: Japanese Patent Application Publication No. 2010-232919

SUMMARY OF THE INVENTION

However, at a certain time point, when a dual terminal exists in a region where only a cell supporting a predetermined communication scheme is set up and a cell supporting another communication scheme is not set up, a process by the dual terminal for searching the cell supporting the other communication scheme is wasted.

In view of the above-described problem, it is an object of the present invention to provide a radio communication system, a network device, a radio terminal, and a communication control method that effectively search a communication area when a different communication area is configured for each of a plurality of communication schemes.

In order to solve the aforementioned problem, the present invention has a following feature.

The feature of the present invention is summarized as a radio communication system (radio communication system 1) having a network device (HSS 140) and a radio terminal (UE200-1, UE200-2) and enabling radio communication by the radio terminal, by using a plurality of communication schemes (LTE and W-CDMA) configuring different communication areas, wherein the network device transmits search ratio information (information of the cell search time-period distribution) indicating a ratio of a time period for searching a communication area (cell) for each of the plurality of communication schemes, to the radio terminal; and the radio terminal receives the search ratio information, and searches a communication area supporting the plurality of communication schemes according to the search ratio information.

In such a radio communication system, the network device transmits search ratio information indicating a ratio of a time period for searching a communication area for each of the plurality of communication schemes, to the radio terminal, and the radio terminal receives the search ratio information, and searches a communication area supporting the plurality of communication schemes according to the ratio of a time period indicated by the search ratio information. Accordingly, it is possible to effectively search a communication area by changing a time period for searching a communication area corresponding to the communication area for each of the communication schemes.

The feature of the present invention is summarized as follows. The network device calculates the search ratio that is a ratio of a time period for searching a communication area for each of the plurality of communication schemes, on the basis of an index regarding communication quality for each of the plurality of communication schemes in a predetermined region.

The feature of the present invention is summarized as follows. The network device increases a corresponding search ratio for a communication scheme having a higher index regarding communication quality, and decreases a corresponding search ratio for a communication scheme having a smaller index regarding communication quality.

The feature of the present invention is summarized as follows. The index regarding communication quality for each of the plurality of communication schemes in a predetermined region is the number of radio base stations, for each of the plurality of communication schemes, installed in the predetermined region.

The feature of the present invention is summarized as follows. The network device estimates a moving direction of the radio terminal, and according to an estimation result, calculates the search ratio for each of the plurality of communication schemes.

The feature of the present invention is summarized as follows. On the basis of information on a communication area around a location estimated as a destination to which the radio terminal moves, the network device calculates the search ratio for each of the plurality of communication schemes.

The feature of the present invention is summarized a network device that manages a radio communication system enabling radio communication by a radio terminal by using a plurality of communication schemes configuring different communication areas, wherein transmitting search ratio information indicating a ratio of a time period for searching a communication area for each of a plurality of communication schemes, to the radio terminal.

The feature of the present invention is summarized a radio terminal enabling radio communication by using a plurality of communication schemes configuring different communication areas, receiving search ratio information indicating a ratio of a time period for searching a communication area for each of a plurality of communication schemes; and searching a communication area supporting the plurality of communication schemes according to the search ratio information.

The feature of the present invention is summarized a communication control method in a radio communication system having a network device and a radio terminal, and enabling radio communication by the radio terminal by using a plurality of communication schemes configuring different communication areas, comprising: a step of, by the network device, transmitting search ratio information indicating a ratio of a time period for searching a communication area for each of the plurality of communication schemes, to the radio terminal; and a step of, by the radio terminal, receiving the search ratio information, and searching a communication area supporting the plurality of communication schemes according to the search ratio information.

DESCRIPTION OF THE EMBODIMENTS

Figure 1:
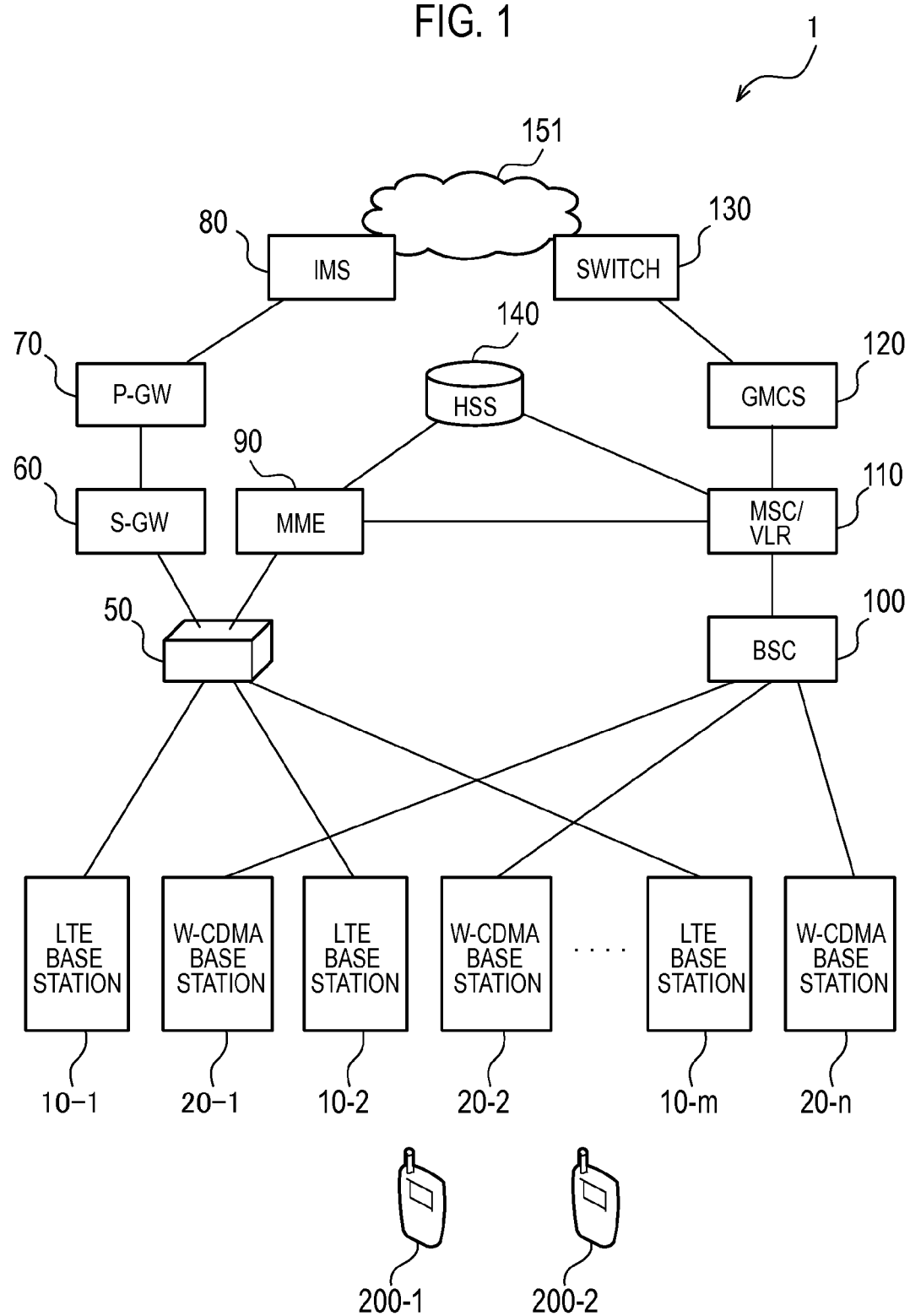
FIG. 1 is a diagram showing the schematic configuration of a radio communication system according to the present embodiment.

Next, with reference to the drawings, an embodiment of the present invention will be described. Specifically, a description will be given in sequence of the configuration of radio communication system, the operation of radio communication system, the operation and effect and other embodiments. In the drawings of the embodiments, the same or similar reference signs are applied to the same or similar parts.

(1) Configuration of Radio Communication System

FIG. 1 is a diagram showing the schematic configuration of a radio communication system according to the present embodiment. A radio communication system 1 shown in FIG. 1 is configured by a radio communication system supporting a communication scheme of LTE (Long Term Evolution) and a radio communication system supporting W-CDMA (Wideband Code Division Multiple Access).

In the present embodiment, the radio communication system supporting LTE includes an LTE base station 10-1 to an LTE base station 10-m (hereinafter, the LTE base station 10-1 to the LTE base station 10-m are collectively referred to as "LTE base station 10", where necessary), a router 50, an S-GW (Serving Gateway) 60, a P-GW (Packet data network Gateway) 70, an IMS (IP Multimedia Subsystem) 80, and an MME (Mobile Management Entity) 90. The router 50, the S-GW 60, the P-GW 70, the IMS 80, and the MME 90 are installed at a backhaul (LTE backhaul) in a radio communication system supporting LTE.

In the present embodiment, the radio communication system supporting W-CDMA includes: a W-CDMA base station 20-1 to a W-CDMA base station 20-n (hereinafter, the W-CDMA base station 20-1 to the W-CDMA base station 20-n are collectively referred to as "CDMA base station 20", where necessary), a BSC (Base Station Controller) 100, an MSC/VLR (Mobile Switching Center/Visitor Location Register) 110, a GMCS (Generalized Multi Carrier Subsystem) 120, and a switch 130. The BSC 100, the MSC/VLR 110, the GMCS 120, and the switch 130 are installed at a backhaul (W-CDMA backhaul) in the radio communication system supporting W-CDMA.

Further, the radio communication system 1 includes an HSS (Home Subscriber Server) 140 that manages a radio communication system supporting LTE and a radio communication system supporting W-CDMA, and a network 151 that connects the radio communication system supporting LTE and the radio communication system supporting W-CDMA.

In the present embodiment, a radio terminal (UE: User Equipment) 200-1 and UE 200-2 (hereinafter, the UE 200-1 and the UE 200-2 are collectively referred to as "UE 200", where necessary) are a dual terminal to support a communication scheme of LTE and that of W-CDMA. When the UE 200-1 and the UE 200-2 exist within a cell that is a communication area configured by the LTE base station 10, it is possible to perform radio communication with the LTE base station 10. Further, when the UE 200-1 and the UE 200-2 exist within a cell that is a communication area configured by the W-CDMA base station 20, it is possible to perform radio communication with the W-CDMA base station 20.

Figure 2:
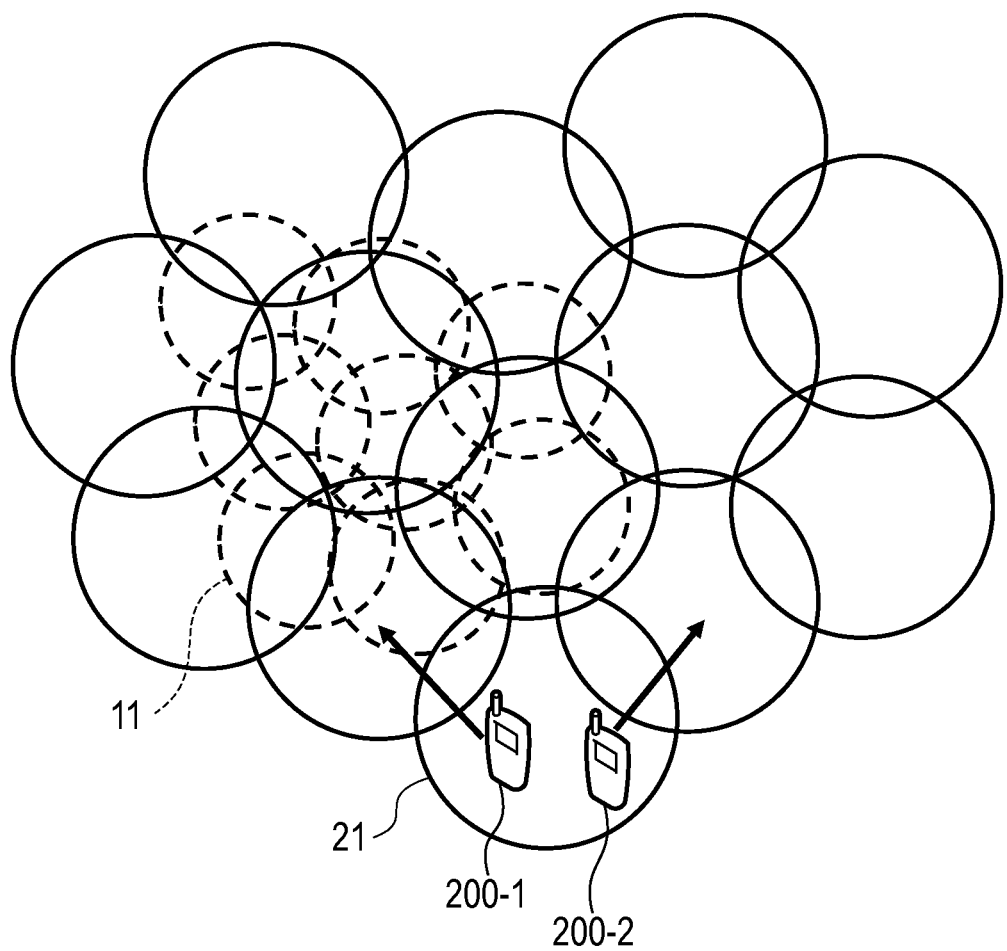
FIG. 2 is a diagram showing the arrangement of a cell in the radio communication system according to the present embodiment.

FIG. 2 is a diagram showing the arrangement of a cell in the radio communication system. As shown in FIG. 2, a cell 11 configured by the LTE base station 10 regionally overlaps with a cell 21 configured by the W-CDMA base station 20.

(1.1) Configuration of HSS

Figure 3:
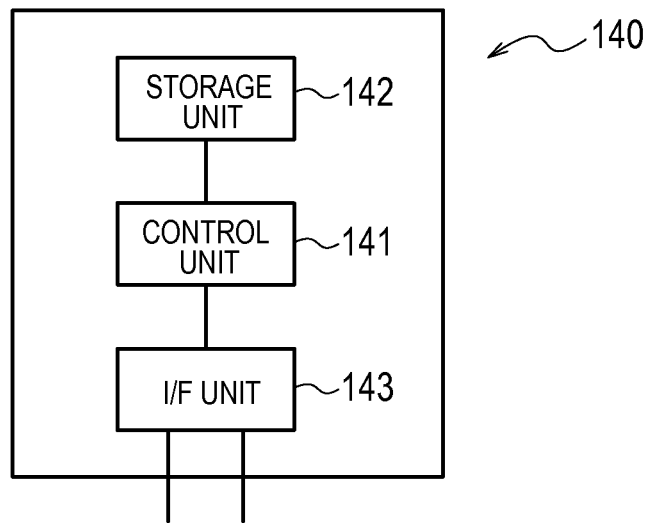
FIG. 3 is a diagram showing the configuration of the HSS according to the present embodiment.

FIG. 3 is a diagram showing the configuration of the HSS 140. The HSS 140 shown in FIG. 3 includes a control unit 141, a storage unit 142, and an I/F unit 143.

The control unit 141 is configured by using a CPU (Central Processing Unit) or a DSP (Digital Signal Processor), for example, and controls various types of functions provided in the HSS 140. The storage unit 142 is configured by a memory, for example, and stores various types of information used for controlling, for example, in the HSS 140.

The I/F unit 143 communicates with the UE 200-1 and the UE 200-2 via the MME 90, the router, and the LTE base station 10 configuring the radio communication system of LTE. Further, the I/F unit 143 communicates with the UE 200-1 and the UE 200-2 via the MSC/VLR 110 and the BSC 100, and the W-CDMA base station 20.

(1.2) Configuration of UE

Figure 4:
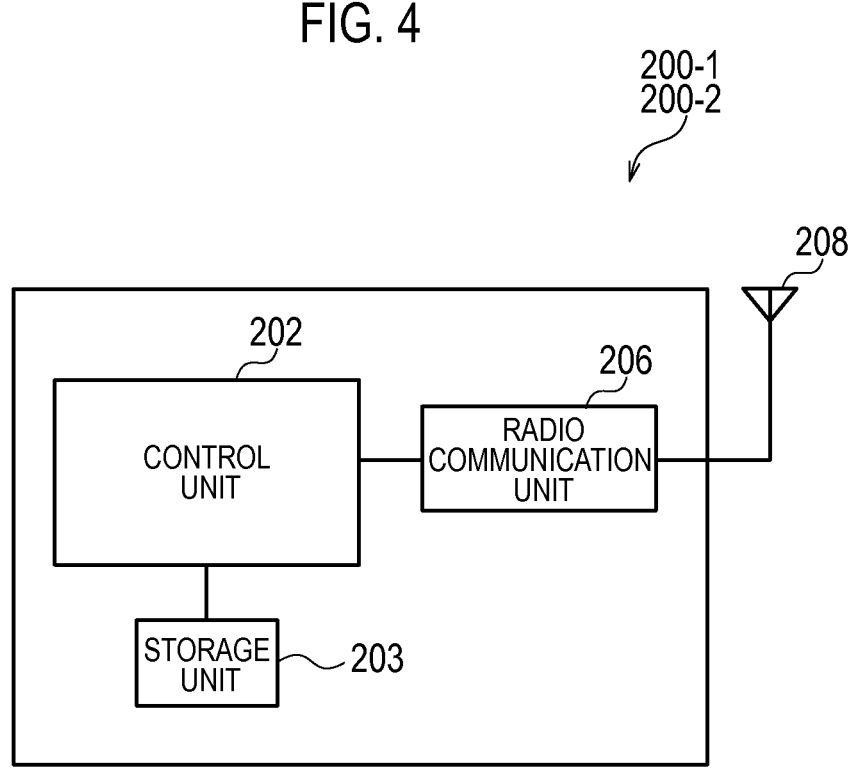
FIG. 4 is a diagram showing the configuration of the radio terminal according to the present embodiment.

FIG. 4 is a diagram showing the configuration of the UE 200-1 and the UE 200-2. The UE 200-1 and the UE 200-2 shown in FIG. 4 include a control unit 202, a storage unit 203, a radio communication unit 206, and an antenna 208.

The control unit 202 is configured by using a CPU or a DSP, for example, and controls various types of functions provided in the UE 200. The storage unit 203 is configured by a memory, for example, and stores various types of information used for the control, for example in the UE 200. Further, the control unit 202 includes a clock function, and a GPS (Global Positioning System) function, and is capable of storing a time and a location of the UE 200 when a predetermined event occurs, into the storage unit 203.

The radio communication unit 206 includes an RF circuit, a baseband circuit and the like, performs modulation and demodulation, encoding and decoding and the like, and transmits and receives a radio signal with the LTE base station 10 or the W-CDMA base station 20 through the antenna 208.

(1.3) Process Relating to a Cell Search Time-Period Distribution Ratio

Next, a process relating to a cell search time-period distribution ratio will be explained.

When a handover to the LTE base station 10 or the W-CDMA base station 20 by the UE 200 occurs, the control unit 202 of the UE 200 controls at each handover so that handover information including a time at which the handover occurs and a location of the UE 200 when the handover occurs is stored in the storage unit 203.

After at least two handovers occur, the control unit 202 of the UE 200 generates a cell search time-period distribution ratio request. The cell search time-period distribution ratio request is a message for requesting a ratio (cell search time-period distribution ratio) of a time period for searching the cell 11 configured by the LTE base station 10 to a time period for searching the cell 21 configured by the W-CDMA base station 20, when the UE 200 searches the cell. The cell search time-period distribution ratio request includes handover information (current handover information) corresponding to a current (latest) handover and handover information (previous handover information) corresponding to a previous (last) handover. Hereinafter, the previous handover information includes a time Tc and a location Pc, and the current handover information includes a time Td and a location Pd.

Further, the control unit 202 of the UE 200 transmits the cell search time-period distribution ratio request, via the radio communication unit 206 and the antenna 208, to the LTE base station 10 or the W-CDMA base station 20 to which the UE 200 connects.

The LTE base station 10 or the W-CDMA base station 20 to which the UE 200 connects receives the cell search time-period distribution ratio request. Next, the LTE base station 10 or the W-CDMA base station 20 includes a cell ID, which is identification information of each base station, in the cell search time-period distribution ratio request. Further, the LTE base station 10 or the W-CDMA base station 20 transmits the cell search time-period distribution ratio request including the cell ID, to the HSS 140.

In the storage unit 142 of the HSS 140, LTE cell set-up information for each of the LTE base stations 10 is stored in which the cell ID is associated with location information indicating an installation location of the LTE base station 10. Further, in the storage unit 142 of the HSS 140, W-CDMA cell set-up information for each of the W-CDMA base stations 20 is stored in which the cell ID is associated with location information indicating an installation location of the W-CDMA base station 20.

The control unit 141 of the HSS 140 receives the cell search time-period distribution ratio request from the LTE base station 10 or the W-CDMA base station 20 via the I/F unit 143.

The control unit 141 of the HSS 140 extracts the cell ID, the current handover information, and the previous handover information included in the cell search time-period distribution ratio request. The control unit 141 of the HSS 140 calculates a velocity vector Vcd of the UE 200 from the previous handover to the current handover, according to Equation 1 below.

$$Vcd=(Pd-Pc)/(Td-Tc) \quad \text{(Equation 1)}$$

The control unit 141 of the HSS 140 sets a region (calculation region) used for calculating the cell search time-period distribution ratio by either one of a first process or a second process below.

(First Process)

The control unit 141 of the HSS 140 sets a fan-shaped region as the calculation region, the fan-shaped region being symmetrical about a velocity vector Vcd from a distal end, the distal end being the current location Pd of the UE 200.

(Second Process)

The control unit 141 of the HSS 140 estimates a location to which the UE 200 will move after a predetermined time period on the basis of: the current location Pd of the UE 200; and the velocity vector Vcd. Specifically, the control unit 141 of the HSS 140 regards a location distant by a value obtained by multiplying a predetermined time period by the magnitude of the velocity vector Vcd in a direction of the velocity vector Vcd from Pd, as the location to which the UE 200 will move after a predetermined time period.

The control unit 141 of the HSS 140 sets a fan-shaped region as the calculation region, the fan-shaped region being symmetrical about the velocity vector Vcd from a distal end, the distal end being a location to which the UE 200 will move.

After the calculation region is set by either the first process or the second process, the control unit 141 of the HSS 140 reads out the LTE cell set-up information in which the location indicated by the location information is within the calculation region, out of the LTE cell set-up information stored in the storage unit 142. The control unit 141 of the HSS 140 reads out the W-CDMA cell set-up information in which the location indicated by the location information is within the calculation region, out of the W-CDMA cell set-up information stored in the storage unit 142.

The number of the read LTE cell set-up information indicates the number of the LTE base stations 10 within the calculation region. The number of the read W-CDMA cell set-up information indicates the number of the W-CDMA base stations 20 within the calculation region. The number of the LTE base stations 10 within the calculation region is an index regarding communication quality of an LTE communication scheme within the calculation region, and the larger the number of the LTE base stations 10 within the calculation region is, the better the communication quality is. The number of the W-CDMA base stations 20 within the calculation region is an index regarding communication quality of a W-CDMA communication scheme within the calculation region, and the larger the number of the W-CDMA base stations 20 within the calculation region is, the better the communication quality is.

The control unit 141 of the HSS 140 calculates a ratio (cell search time-period distribution ratio) between a time Tlr for searching the cell 11 configured by the LTE base station 10 and a time Tcr for searching the cell 21 configured by the W-CDMA base station 20 on the basis of the number Ln of the LTE base stations 10 within the calculation region and the number Cn of the W-CDMA base stations 20 within the calculation region. Specifically, the control unit 141 of the HSS 140 calculates the cell search time-period distribution ratio so that Tlr:Tcr=Ln:Cn is achieved.

Figure 5:
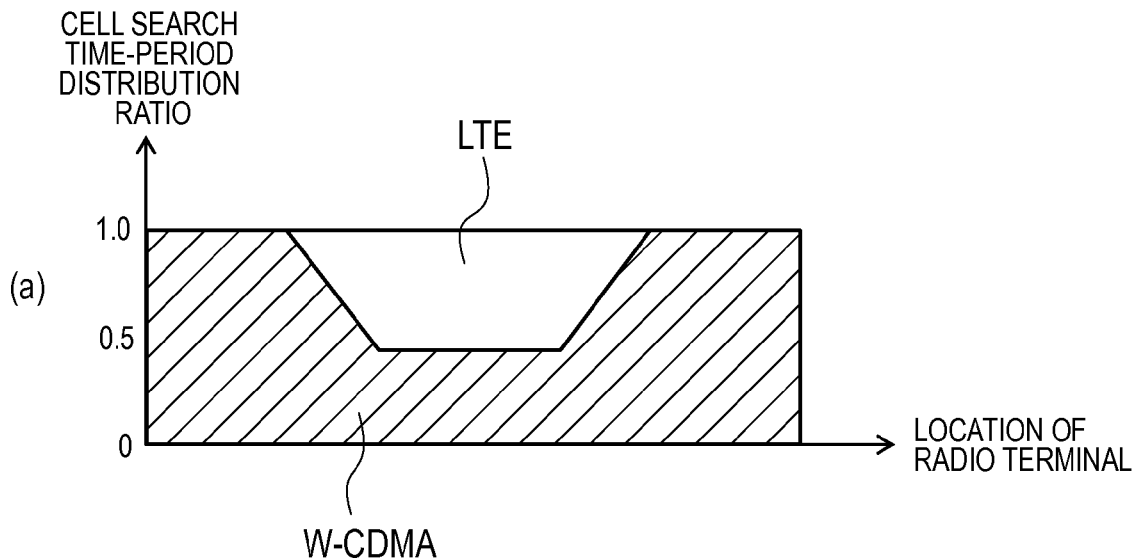
FIG. 5 is a diagram showing one example of the cell search time-period distribution ratio according to the present embodiment.
Figure 5:
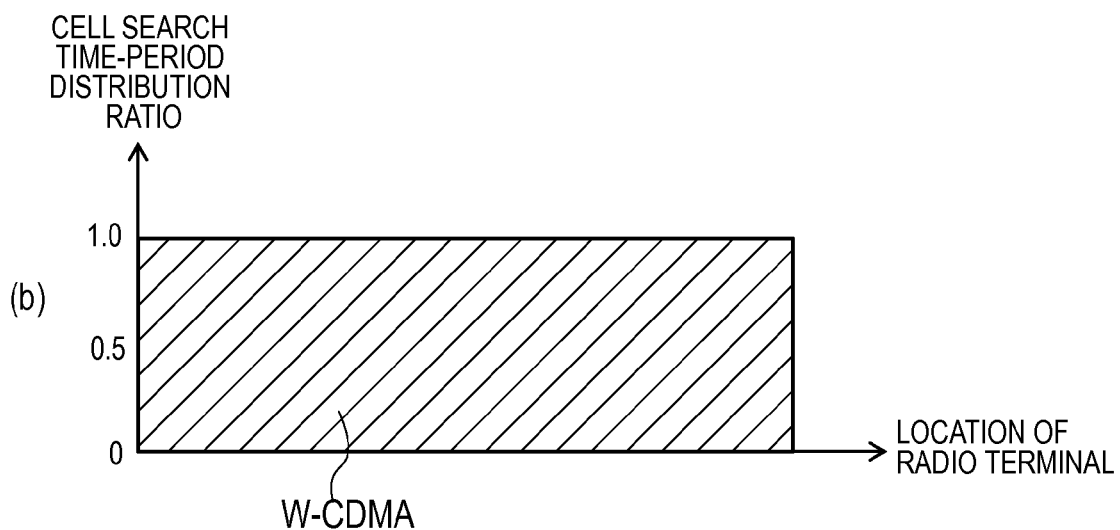

FIG. 5 is a diagram showing one example of the cell search time-period distribution ratio.

FIG. 5(*a*) shows an example of a case in which the UE 200-1 moves, as shown in FIG. 2. As shown in FIG. 2, the UE 200-1 moves toward a region where the cell 11 configured by the LTE base station 10 overlaps with the cell 21 configured by the W-CDMA base station 20. Thus, the cell search time-period distribution ratio transitions in the order of: a search for only the cell 21 configured by the W-CDMA base station 20, a search for the cell 11 configured by the LTE base station 10 and the cell 21 configured by the W-CDMA base station 20, and a search for only the cell 21 configured by the W-CDMA base station 20, according to the movement of the UE 200-1, as shown in FIG. 5(*a*).

FIG. 5(*b*) shows an example of a case in which the UE 200-2 moves, as shown in FIG. 2. As shown in FIG. 2, the UE 200-2 moves toward a region where only the cell 21 configured by the W-CDMA base station 20 exists. Thus, the cell search time-period distribution ratio is subject to the search for only the cell 21 configured by the W-CDMA base station 20, as shown in FIG. 5(*b*).

The control unit 141 of the HSS 140 transmits a cell search time-period distribution ratio response, which is a message including the information of the calculated cell search time-period distribution ratio, to the LTE base station 10 or the W-CDMA base station 20 from which the cell search time-period distribution ratio request is transmitted. The transmission destination is designated by a cell ID included in the cell search time-period distribution ratio request.

The LTE base station 10 or the W-CDMA base station 20 transmits the cell search time-period distribution ratio response to the UE 200 from which the cell search time-period distribution ratio request is transmitted.

The control unit 202 of the UE 200 receives the cell search time-period distribution ratio response via the antenna 208 and the radio communication unit 206. The control unit 202 of the UE 200 sets a time period for searching the cell 11 configured by the LTE base station 10 and a time period for searching the cell 21 configured by the W-CDMA base station 20, according to the information of the cell search time-period distribution ratio included in the cell search time-period distribution ratio response, and searches the cell 11 and the cell 21.

(2) Operation of Radio Communication System

Figure 6:
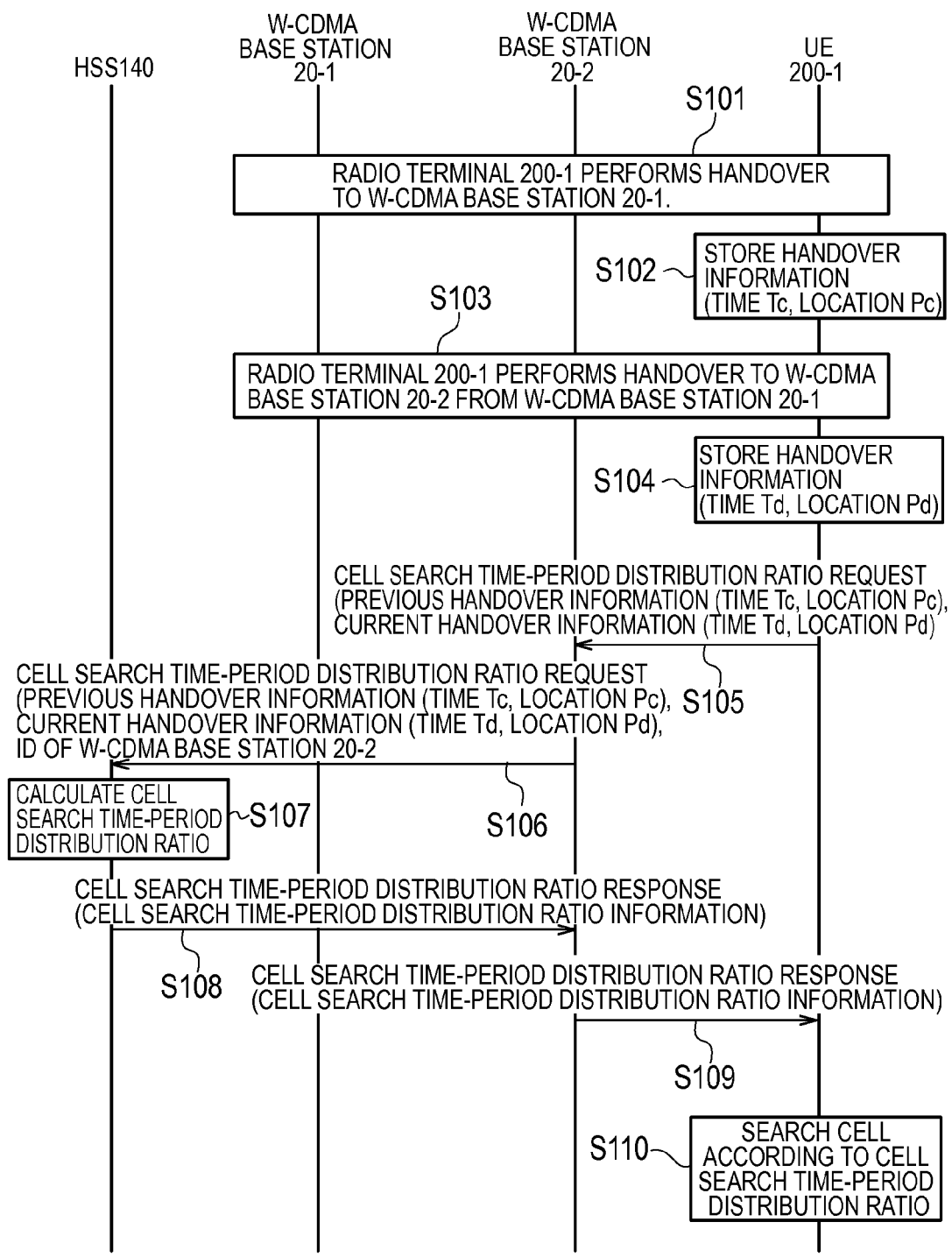
FIG. 6 is a sequence diagram showing an operation of the radio communication system according to the present embodiment.

FIG. 6 is a sequence diagram showing an operation of the radio communication system 1.

In step S101, when the UE 200-1 performs handover to the W-CDMA base station 20-1, in step S102, the UE 200-1 stores the time Tc when the handover occurs and the location Pc of the UE 200-1 when the handover occurs.

In step S103, when the UE 200-1 performs handover from the W-CDMA base station 20-1 to the W-CDMA base station 20-2, in step S104, the UE 200-1 stores the time Td when the handover occurs and the location Pd of the UE 200-1 when the handover occurs.

In step S105, the UE 200-1 transmits the cell search time-period distribution ratio request including the previous handover information configured by the time Tc and the location Pc and the current handover information configured by the time Td and the location Pd, to the W-CDMA base station 20-2. The W-CDMA base station 20-2 receives the cell search time-period distribution ratio request.

In step S106, the W-CDMA base station 20-2 transmits the cell search time-period distribution ratio request including the previous handover information, the current handover information, and the cell ID of the W-CDMA base station 20-2, to the HSS 140. The HSS 140 receives the cell search time-period distribution ratio request.

In step S107, the HSS 140 calculates the ratio between the time period for searching the cell 11 configured by the LTE base station 10 and the time period for searching the cell 21 configured by the W-CDMA base station 20 (cell search time-period distribution ratio), on the basis of the cell search time-period distribution ratio request.

In step S108, the HSS 140 transmits the cell search time-period distribution ratio response including the information on the cell search time-period distribution ratio, to the W-CDMA base station 20-2. The W-CDMA base station 20-2 receives the cell search time-period distribution ratio response.

In step S109, the W-CDMA base station 20-2 transmits the cell search time-period distribution ratio response to the UE 200-1. The UE 200-1 receives the cell search time-period distribution ratio response.

In step S110, the UE 200-1 searches the cell 11 configured by the LTE base station 10 and the cell 21 configured by the W-CDMA base station 20 according to the information on the cell search time-period distribution ratio included in the cell search time-period distribution ratio response.

(3) Operation and Effect

In the radio communication system 1 according to the present embodiment, the HSS 140 calculates the ratio between the time period for searching the cell 11 configured by the LTE base station 10 and the time period for searching the cell 21 configured by the W-CDMA base station 20 (cell search time-period distribution ratio), and transmits the cell search time-period distribution ratio response including the cell search time-period distribution ratio to the UE 200. Upon receipt of the cell search time-period distribution ratio response, the UE 200 searches the cell 11 and the cell 21 in accordance with the cell search time-period distribution ratio included in the cell search time-period distribution ratio response.

Therefore, it is possible to change a time period for searching the cell for each communication scheme of LTE and W-CDMA, and thus, it is possible to effectively search the cell.

Further, the HSS 140 sets a fan-shaped region as the calculation region, the fan-shaped region being symmetrical about a velocity vector Vcd from a distal end, the distal end being a current location Pd of the UE 200. Alternately, the HSS 140 estimates the location to which the UE 200 will move after a predetermined time period on the basis of: the current location Pd of the UE 200; and the velocity vector Vcd, and the HSS 140 sets a fan-shaped region as the calculation region, the fan-shaped region being symmetrical about a velocity vector Vcd from a distal end, which is a location to which the UE 200 will move. Moreover, the HSS 140 calculates the ratio between the time period for searching the cell 11 and the time period for searching the cell 21, according to the ratio between the number of the LTE base stations 10 within the calculation region and the number of the W-CDMA base stations 20 within the calculation region.

The number of the LTE base stations 10 within the calculation region is an index regarding communication quality of an LTE communication scheme within the calculation region, and the larger the number of the LTE base stations 10 within the calculation region is, the better the communication quality is. Further, the number of the W-CDMA base stations 20 within the calculation region is an index regarding the communication quality of the communication scheme of W-CDMA within the calculation region, and the larger the number of the W-CDMA base stations within the calculation region is, the better the communication quality is. Therefore, the HSS 140 calculates the ratio between the time period for searching the cell 11 and the time period for searching the cell 21 according to the ratio between the number of the LTE base stations 10 within the calculation region and the number of the W-CDMA base stations 20 within the calculation region so as to enable calculation of the appropriate cell search time-period distribution ratio according to the communication quality.

(4) Other Embodiments

As mentioned above, the present invention has been described according to the embodiment. However, it must not be understood that the discussions and the drawings constituting a part of this disclosure limit the present invention. From this disclosure, various alternative embodiments, examples and operational techniques are apparent to those skilled in the art.

In the above-described embodiment, the HSS 140 calculates the cell search time-period distribution ratio according to the ratio between the number of the LTE base stations 10 within the calculation region and the number of the W-CDMA base stations 20 within the calculation region. However, the HSS 140 may calculate the cell search time-period distribution ratio according to another index regarding communication quality.

For example, according to a ratio between SINR of a radio signal from the LTE base station 10 and SINR of a radio signal from W-CDMA in the UE 200, it is possible to calculate the ratio between the time period for searching the cell 11 and the time period for searching the cell 21.

In the above-described embodiment, the HSS 140 receives the cell search time-period distribution ratio request from the UE 200, calculates the cell search time-period distribution ratio, and transmits the cell search time-period distribution ratio response to the UE 200. However, a device other than the HSS 140, a network device that manages the radio communication system supporting a plurality of communication schemes may receive the cell search time-period distribution ratio request from the UE 200, may calculate the cell search time-period distribution ratio, and may transmit the cell search time-period distribution ratio response to the UE 200.

In the above-described embodiment, the radio communication system 1 is configured by the radio communication system supporting LTE and the radio communication system supporting W-CDMA; however, it is similarly possible to apply the present invention to a case where the radio communication system 1 is configured by a radio communication system supporting another radio communication scheme.

As mentioned above, it must be understood that the present invention includes various embodiments and the like that are not described herein.

Note that the entire content of the Japanese Patent Application No. 2011-084766 (filed on Apr. 6, 2011) is incorporated herein by reference.

INDUSTRIAL APPLICABILITY

As mentioned above, the radio communication system, the network device, the radio terminal, and the communication control method according to the present invention are useful in radio communication, with which it is possible to effectively search a communication area when a different communication area is configured for each of a plurality of communication scheme.

The invention claimed is:

1. A radio communication system having a network device and a radio terminal and enabling radio communication by the radio terminal, by using a plurality of communication schemes configuring different communication areas, wherein
   the network device transmits search ratio information indicating a ratio of a time period for searching a communication area for each of the plurality of communication schemes, to the radio terminal; and
   the radio terminal receives the search ratio information, and searches a communication area supporting the plurality of communication schemes according to the search ratio information.

2. The radio communication system according to claim 1, wherein the network device calculates the search ratio that is a ratio of a time period for searching a communication area for each of the plurality of communication schemes, on the basis of an index regarding communication quality for each of the plurality of communication schemes in a predetermined region.

3. The radio communication system according to claim 2, wherein the network device increases a corresponding search ratio for a communication scheme having a higher index regarding communication quality, and decreases a corresponding search ratio for a communication scheme having a smaller index regarding communication quality.

4. The radio communication system according to claim 2, wherein the index regarding communication quality for each of the plurality of communication schemes in a predetermined region is the number of radio base stations, for each of the plurality of communication schemes, installed in the predetermined region.

5. The radio communication system according to claim 1, wherein the network device estimates a moving direction of the radio terminal, and according to an estimation result, calculates the search ratio for each of the plurality of communication schemes.

6. The radio communication system according to claim 1, wherein on the basis of information on a communication area around a location estimated as a destination to which the radio terminal moves, the network device calculates the search ratio for each of the plurality of communication schemes.

7. A network device that manages a radio communication system enabling radio communication by a radio terminal by using a plurality of communication schemes configuring different communication areas, wherein
   transmitting search ratio information indicating a ratio of a time period for searching a communication area for each of a plurality of communication schemes, to the radio terminal.

8. A radio terminal enabling radio communication by using a plurality of communication schemes configuring different communication areas,
   receiving search ratio information indicating a ratio of a time period for searching a communication area for each of a plurality of communication schemes; and
   searching a communication area supporting the plurality of communication schemes according to the search ratio information.

9. A communication control method in a radio communication system having a network device and a radio terminal, and enabling radio communication by the radio terminal by using a plurality of communication schemes configuring different communication areas, comprising:
   a step of, by the network device, transmitting search ratio information indicating a ratio of a time period for searching a communication area for each of the plurality of communication schemes, to the radio terminal; and
   a step of, by the radio terminal, receiving the search ratio information, and searching a communication area supporting the plurality of communication schemes according to the search ratio information.

* * * * *